Aug. 10, 1971 R. T. RAYMON Re. 27,161

ADJUSTABLE CLOSURE LOCK

Original Filed July 18, 1967

INVENTOR.
Raymond T. Raymon
BY
Peck & Peck
ATTORNEYS

United States Patent Office

Re. 27,161
Reissued Aug. 10, 1971

27,161
ADJUSTABLE CLOSURE LOCK

Raymond T. Raymon, Warren, Mich., assignor to Home Guard Control, Inc., Detroit, Mich.

Original No. 3,420,001, dated Jan. 7, 1969, Ser. No. 654,136, July 18, 1967. Application for reissue Dec. 22, 1969, Ser. No. 886,958
Int. Cl. E05d *13/04*
U.S. Cl. 49—449 20 Claims

Matter enclosed in heavy brackets [ ] appears in the original patent but forms no part of this reissue specification; matter printed in italics indicates the additions made by reissue.

ABSTRACT OF THE DISCLOSURE

A lock for use with sliding closure panels, and the like, to lockingly maintain a panel in adjusted partially open position, against further opening, or in fully closed position. A locking bar of adjustable length pivotally mounted at one end, and inoperative locking position disposed in the horizontal guide track for the panel, and extending therein in a plane parallel to the plane of sliding movement of the panel, and in inoperative position disposed in the vertical channel guide track for the panel. The adjustable locking bar in operative position having the free end thereof engaged against the rear edge of the panel to prevent the panel from being moved rearwardly. Clamping means positioned in said vertical channel guide track for releasably maintaining said locking bar in inoperative position.

This invention relates broadly to means for maintaining a sliding panel closure, and the like, in partially open position, or in fully closed position, and in its more specific aspects it relates to such means which is adjustable, and is mounted in the horizontal channel guide track for the panel, and in inoperative position is releaseably mounted in the vertical channel guide track for the panel; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

With the increased widespread use of sliding closure panels, whether used for doors, windows, or the like, a substantial need has arisen for some sound and certain means to maintain a sliding panel member in partially open position, so that it may not be further opened to permit unauthorized entry into the area bounded by such sliding closure panel system.

While I am aware that locking means for this purpose are now known, it has been my experience that such prior means are not certain in their locking operation and may be relatively easily broken or tampered with so that unauthorized access to the area may be had. It has been my prime purpose to overcome the objections to prior means for maintaining a closure, or the like, sliding panel in partially open position, or in fully closed position, and I have devised a locking means ensuring that such sliding panel may not be slid into position enlarging the opening so that access may be had to the area bounded by the closure system.

In devising this innovation which is sure and certain in its locking function, I have not sacrificed the appearance of the entire sliding closure panel system, for I have so mounted and arranged the locking means that it is substantially hidden from view and does not provide a prominent visual feature of the closure system.

It is fully recognized that for such a locking device to be of the greatest utility and operative satisfaction when combined with a sliding panel system it must be provided with simple means whereby the opening produced by the sliding of the panel may be varied within certain limits. Appreciating this desirable characteristic I have developed a locking means having simple adjusting features so that the size of the opening produced by sliding of a panel may be varied within certain limits.

Since a substantial number of sliding panel systems of the character in which I am interested are now in use, it has been one of my fundamental objects to design a locking means which may be combined with an already built and installed panel system without in any way requiring change or alteration to such system, or its mounting, and by so designing this locking means that it may be installed with facility I have substantially reduced the time and expense incident to the installation thereof.

The locking means of this invention involves a locking bar, the length of which is adjustable so as to vary the size of the opening formed by sliding the panel. I have devised a unique and novel adjusting means for this locking bar which does not detract in any manner whatsoever from the attractive appearance of the device.

The locking means of this invention is operable by anyone with ordinary intellect, and no skill is required, and it is so mounted and constructed that it may be moved expeditiously from operative locking position to inoperative position, and in either one of these positions it is substantially hidden from view and does not produce a dominant visual feature of the sliding panel system.

My efforts have been devoted to evolving a sure and secure locking means for the purposes described, and have also been directed to producing such a means economically and one which may readily be installed by a person having no unusual skills.

As this description proceeds it will be apparent that when my locking mechanism is utilized with a sliding closure panel system constituting a window, door, or the like, a sliding panel may be left open up to the limits of the locking means with no possibility of its being opened any further by an intruder, so that the occupants of the house may relax in the knowledge that they are safe against additional opening of a panel so that entry may be gained. It will, of course, be understood that with a panel locked in accordance with this invention in open adjusted position, the building or enclosure may be safely left for any length of time.

A substantial advantage of this innovation resides in the fact that when it is being used, a room may be ventilated at night while the occupants are asleep, and that they may sleep with no fear of unwanted intrusion through the closure panel system.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings.

Figure 1:
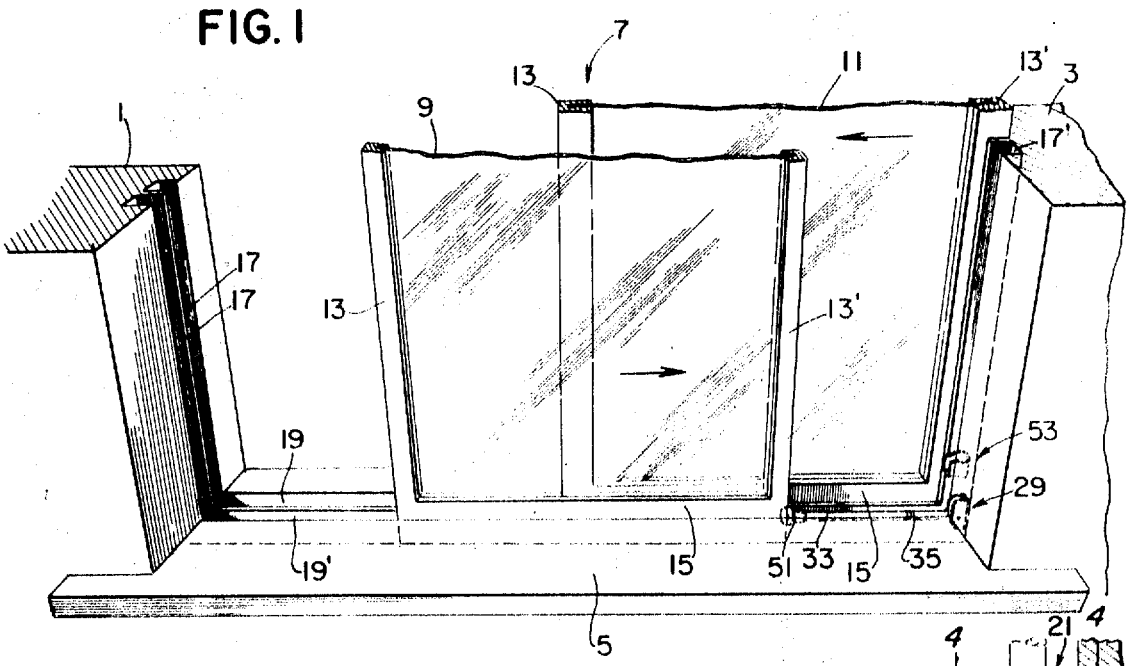
FIG. 1 is a view in perspective of a sliding panel system having my locking means operatively combined therewith, parts thereof being broken away.

In the accompanying drawings, and particularly in FIG. 1 thereof, I have illustrated one type of sliding closure panel system with which my locking means may be used. I have illustrated an opening into an enclosure and have used the numerals 1 and 3 to designate the conventional vertical frame members defining the ends of an opening and the numeral 5 to designate the usual sill member which defines the bottom of the opening. A top frame member (not shown) will also be provided. I have disclosed a panel system which is designated generally by the numeral 7, and in this instance, I have shown a sliding panel system comprising a pair of sliding panels 9 and 11. Each of these panels 9 and 11 are framed in the usual manner by relatively rigid vertical frame elements 13 and 13' and lower horizontal elements 15. It will, of course, be understood that each panel element is formed with a top horizontal frame element corresponding to the bottom frame element 15. The panels 9 and 11 may be transparent, translucent, opaque, reticulated, or formed of any other suitable and desirable type of perforate or imperforate material.

Inset into each vertical frame 1 and 3 are a pair of parallel track forming channel members 17 and 17', which at their lower ends open into a pair of horizontal parallel track forming channel members 19 and 19'. It will be appreciated that horizontal upper track forming channels are provided in the framework which correspond to the lower channels 19 and 19'. The panel 9 is mounted to slide in the channels 17, 19, and 17', while the panel 11 is mounted to slide in the other channels 17 and 19. The construction described above is generally a conventional mounting and operating arrangement for sliding panels, and it is to be understood that these panels 9 and 11 may function as closure or protective members for any type of opening.

The locking means of this invention comprises a generally cylindrical locking bar which I have designated in its entirety by the numeral 21. Such locking bar is pivotally mounted as at 23 between a pair of spaced apart flanges 25 which extend forwardly from the base 27 of a locking bar supporting bracket, which I have designated in its entirety by the numeral 29. The locking bar supporting bracket 29 is mounted by means of screws, or the like 31, in the vertical channel 17', which forms a part of the horizontal channel 19' in which the panel 9 is slidably mounted. It will thus be apparent, that the locking bar clamping bracket 29, when in mounted position, is disposed within the vertical track forming channel 17'.

The locking bar 21 is composed of two components, a forward component 33 and a root component 35, the root component 35 being pivotally connected for pivoting action between the flanges 25 of the locking arm supporting bracket 29. The forward component 33 of the locking bar 21 is formed with a rearwardly extending screw stem 37 which is externally threaded, for a purpose to be hereinafter described. The screw stem 37 is of a less diameter than the forward component 33, and the forward component 33 is provided with a rearwardly extending skirt portion 39 which is of equal diameter with the forward component 33, is shaped the same and is spaced from the screw stem 37 which is housed within the skirt 39. It is preferable, though not necessary, that the screw stem 37 be of somewhat greater length than the skirt 39.

The root component 35 of the locking bar 21 is substantially shorter than the length of the combination of the forward component 33 and the rearwardly extending skirt 39, and is provided with a centrally disposed recess 41 therein, which when the component 33 and the root 35 are combined together, is in alignment with the screw stem 37 so that the extending portion 43 thereof may extend into said recess 41. Extending forwardly from the forward end 45 of the root component 35 is a sleeve or tubular member 47 which is internally threaded and is of a diameter which is adapted to threadedly receive the screw stem 37 of the forward component 33. It will be appreciated that the sleeve 47, when the component 33 and the root component 35 are joined together, extends between or into the area 49 between the screw stem 37 and the skirt 39.

I position on the forward end of the component 33 a sheath like snubbing element 51 which may be formed of rubber, or the like, relatively soft material. As will become apparent as this description proceeds, the snubbing element 51, when the locking means is in operative position, is in engagement with the rear vertical frame member 13' of the sliding panel 9.

Positioned within the vertical track forming channel 17' is a clamping means which I have designated in its entirety by the numeral 53. This clamping means 53 is fastened within the channel 17' in position therein spaced any desirable distance above the locking bar supporting bracket 29. The clamping means 53, in this particular instance, consists of a pair of spaced apart clamping fingers 55 which extend from a base 57, and the clamping means 53 is fixed within the channel 17' in any suitable manner, as by a screw 59 which is screwed into vertical frame 3. The clamping fingers 55 are spaced apart a distance less than the diameter of the locking bar 21 so that they will clampedly receive between them said clamping bar and maintain it in vertical inoperative position, as will be explained.

Figure 2:
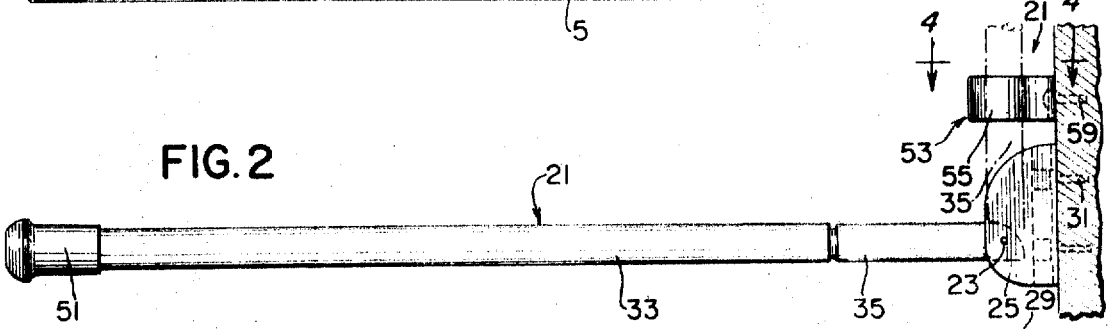
FIG. 2 is a view in side elevation illustrating my locking means in operative position locking a sliding panel in adjusted open position, and illustrating in dotted lines my locking means in vertical inoperative position.
Figure 3:
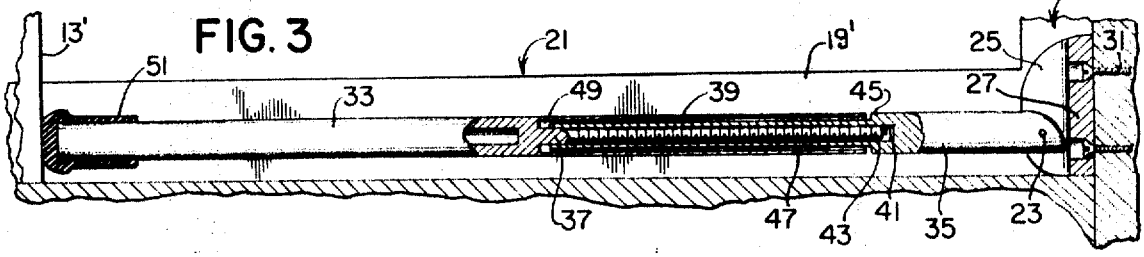
FIG. 3 is a view generally similar to FIG. 2 but with parts thereof in section to illustrate my adjusting mechanism.
Figure 4:
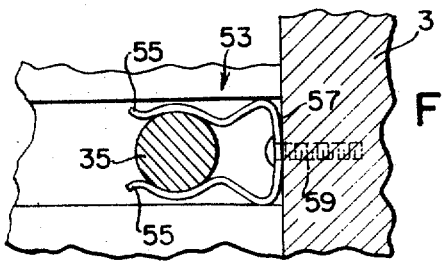
FIG. 4 is a view taken on line 4—4 of FIG. 2.

In order to adjustably connect the forward component with the root portion 35 of the locking bar, the forward component 33 is rotated to thereby screw the screw stem 37 into the sleeve 47 and the skirt 39 will extend over and conceal the screw stem 37 and the tubular member 47 from view. When the two components of the locking bar 21 are connected together, in a manner as described, and when locking bar 21 is in its most reduced length position, as shown in FIGS. 2 and 3, the extending end 43 of the screw stem 37 will extend into the recess 41 in the root component 35 of the locking bar 21. It will be recognized that by rotating the forward component 33 relative to the root component 35 and the forwardly extending tubular member 47, the length of the locking bar 21, may be adjusted as to its length so that the panel 9 may be slid to various positions to vary the opening 61.

When the locking bar 21 is pivoted downwardly on the locking bar supporting bracket into operative panel locking position, it will be disposed in the track forming channel 19' so that it will not be a significant or dominant visual feature of the panel system. In this operative position the locking bar 21 will extend forwardly in the track forming channel 19' in a plane which is parallel to the plane of sliding movement of the panel 9, or of any panel which the locking bar is designed to lock in adjusted position. When in operative position the snubbing element 51 which is disposed on the forward end of the component 33 will be in engagement with the rear vertical framing element 13' of the panel 9 and will thereby prevent further rearward sliding movement of the panel 9 which would enlarge the opening 61 in the panel system.

When the locking means is not in use it is pivoted upwardly on the locking bar supporting bracket 29 into vertical position with the clamping fingers 55 of the clamping means 53 embracing and clamping the locking bar 21 to thereby maintain it in inoperative vertical position extending upwardly within the track forming channel 17'.

One of the significant features of this invention resides in the novel adjusting means which I have provided for the locking bar 21, for this means which I have evolved hides from view the various threaded elements of the adjusting means. It is to be distinctly understood that any generally similar adjusting means may be employed and such means will still fall within the spirit and scope of my invention.

While I have illustrated in the drawings only one locking means being employed in the panel system 7, it will be appreciated that a further locking means may be used as desired to regulate the opening produced by sliding the panel 11 in the direction of the arrow. Such additional locking means would, of course, be mounted in the same manner as the one heretofore described with the exception that the locking bar supporting bracket would be mounted in the vertical channel 17 and when in operative position the locking bar would extend into the horizontal channel 19 for engagement with the vertical frame 13 of the panel 7, and the clamping means 53 would be mounted in the vertical channel 17 in position therein above the locking bar supporting bracket 29.

It will be understood that the locking bar 21 may be used to maintain a panel in fully closed position, as well as in partially open position, and this may be accomplished by adjusting the locking bar 21 to the suitable length.

I claim:

1. Locking means for sliding panels to maintain a panel in adjusted partially open position, comprising an elongated rigid locking bar fixed at one end against axial movement and at its other end adapted to engage the rear edge of a sliding panel, and said locking bar including means to vary the length thereof, *said means being internal of said bar and concealed from external view at all varied lengths of the bar.*

2. Locking means in accordance with claim 1, wherein said means to vary the length of the locking bar includes elements having threads thereon for threadedly connecting said elements together [, and said threads are concealed from view at all varied lengths of said locking bar].

3. Locking means in accordance with claim 1, wherein said elongated rigid locking bar includes a root component fixed at one end against axial movement, and a forward component removably and adjustably connected at one end to said root component at the other end of said root component, and the other end of said forward component adapted to lockingly engage the rear edge of a sliding panel.

4. Locking means in accordance with claim 3, wherein said root component is provided with a forwardly extending internally threaded tubular member, and said forward component is provided with a rearwardly extending externally threaded stem of a diameter for threaded relation within said tubular member, whereby the length of said locking bar may be varied.

5. Locking means in accordance with claim 4, wherein said forward component is provided with a rearwardly extending skirt spaced from and surrounding said stem.

6. Locking means in accordance with claim 5, wherein said tubular member extends between said stem and said skirt when said root and forward components are connected together.

7. Locking means in accordance with claim 1, wherein said elongated rigid locking bar is pivotally mounted at said one end for pivoting movement from horizontal to vertical position.

8. A sliding panel system including, in combination, vertical frame members and a horizontal frame member, sliding panels, vertical and horizontal panel guide tracks fixed in said frame members and said panels mounted in said panel guide tracks, and means for locking a panel in adjusted partially open position, said means comprising an elongated rigid locking bar fixed at one end against axial movement, in a vertical panel guide track and in operative position extending substantially horizontally in a horizontal panel guide track.

9. A sliding panel system in accordance with claim 8, wherein said elongated rigid locking bar when in operative position extends in plane parallel to the plane of the path of the panel in its sliding movements.

10. A sliding panel system in accordance with claim 8, wherein said elongated locking bar is pivotally mounted at said one end for pivoting from horizontal operative position to vertical inoperative position, said elongated locking bar being disposed in a vertical panel guide track when in inoperative position.

11. A sliding panel system in accordance with claim 10, wherein means is provided for releasably maintaining said elongated locking bar in vertical inoperative position.

*12. Locking means in accordance with claim 1, wherein said length-varying means includes axially telescoped, external tubular and internal components moving relatively axially in engagement with one another in the varying of the bar length.*

*13. Locking means in accordance with claim 12, wherein one of said components is fixed at one end against axial movement, the other component being adapted to abuttingly engage an edge of a sliding panel.*

*14. Locking means in accordance with claim 13, wherein said fixed component end has means to pivotally connect it to a fixed support member.*

*15. A sliding panel system including, in combination, a vertical frame member and a horizontal bottom frame member, having a horizontal panel guide track, a panel slidingly mounted in said guide track, and means for locking said panel against movement in one direction in said track, said means comprising an elongated rigid locking bar disposed in operative position at one end thereof adjacent the bottom of said vertical frame member and in a relatively fixed axial relation to the latter, said locking bar in operative position extending substantially horizontally in the horizontal panel guide track into abutting engagement with an edge of said panel, and being movable to an inoperative substantially vertical position adjacent and substantially paralleling said vertical frame member.*

*16. A sliding panel system in accordance with claim 15, wherein said locking bar has movable means to vary the effective overall length thereof in its said operative position between said vertical frame member and said panel edge.*

*17. A sliding panel system in accordance with claim 16, wherein said movable length varying means is internal of said locking bar, being concealed from external view.*

*18. A sliding panel system in accordance with claim 15, wherein said vertical frame member has a vertical guide track in which said locking bar is disposed in its said inoperative position.*

*19. A sliding panel system in accordance with claim 16, wherein said vertical frame member has a vertical guide track in which said locking bar is disposed in its said inoperative position.*

*20. A sliding panel system in accordance with claim 17, wherein said vertical frame member has a vertical guide track in which said locking bar is disposed in its said inoperative position.*

References Cited

The following references, cited by the Examiner, are of record in the patented file of this patent or the original patent.

UNITED STATES PATENTS

| | | | |
|---|---|---|---|
| 769,209 | 9/1904 | De Lan | 292—194X |
| 979,251 | 12/1910 | Berry | 49—449X |
| 1,601,524 | 9/1926 | Gibbons | 292—305 |
| 1,983,054 | 12/1934 | Straker | 49—450X |
| 2,407,837 | 9/1946 | Kissel | 49—449X |
| 2,775,001 | 12/1956 | Baker | 49—449X |
| 3,287,050 | 11/1966 | Ferrante | 292—262X |
| 3,471,189 | 10/1969 | Ness | 49—449X |

J. KARL BELL, Primary Examiner

U.S. Cl. X.R.

49—450; 292—262, 338